Feb. 27, 1951  E. DACKOR ET AL  2,543,236
POLISHING MACHINE FOR TURBINE BLADES
Filed Dec. 29, 1948  10 Sheets-Sheet 1
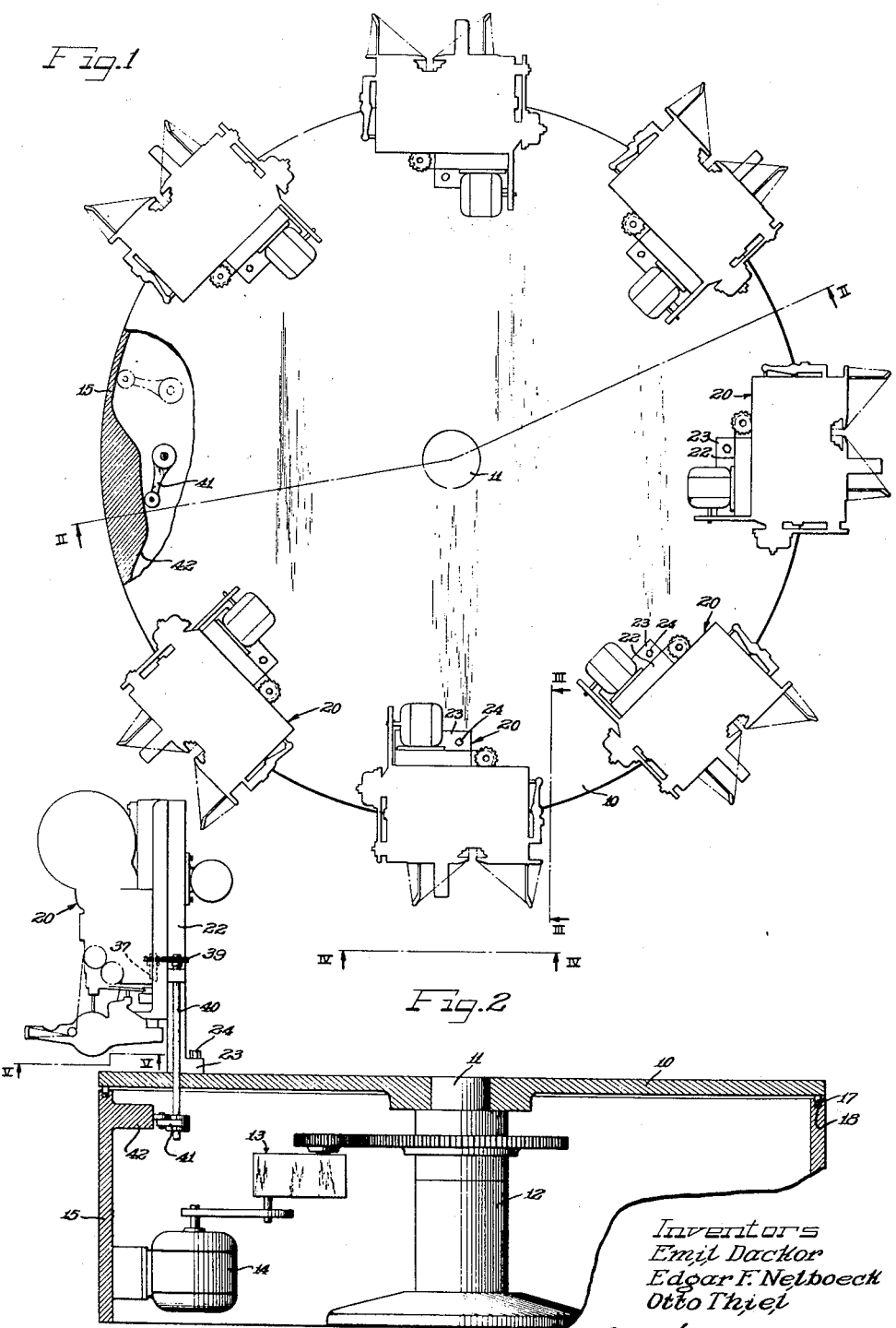
Inventors
Emil Dackor
Edgar F. Nelboeck
Otto Thiel
By The Firm of Charlesw Hill Attys

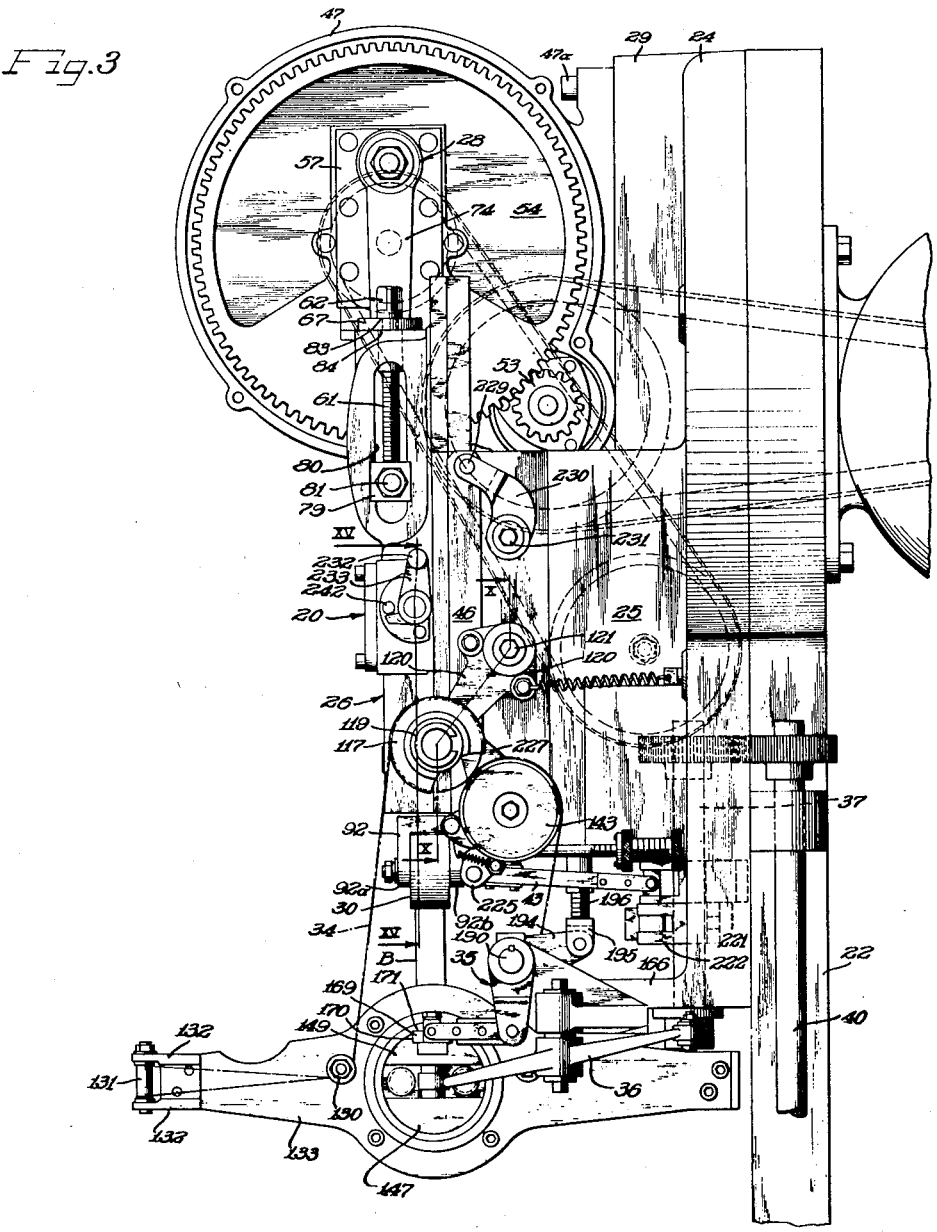

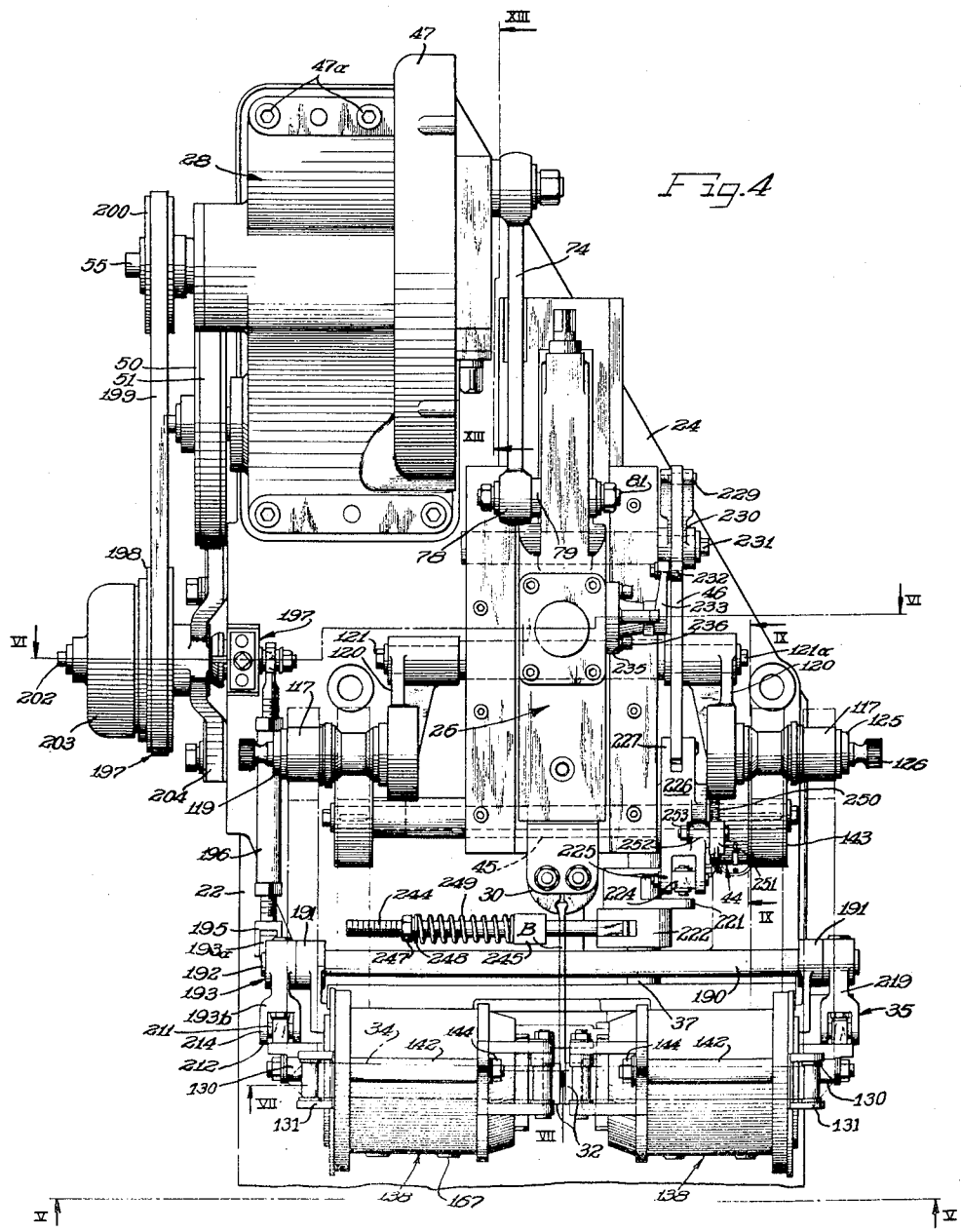

Feb. 27, 1951 E. DACKOR ET AL 2,543,236
POLISHING MACHINE FOR TURBINE BLADES
Filed Dec. 29, 1948 10 Sheets-Sheet 4
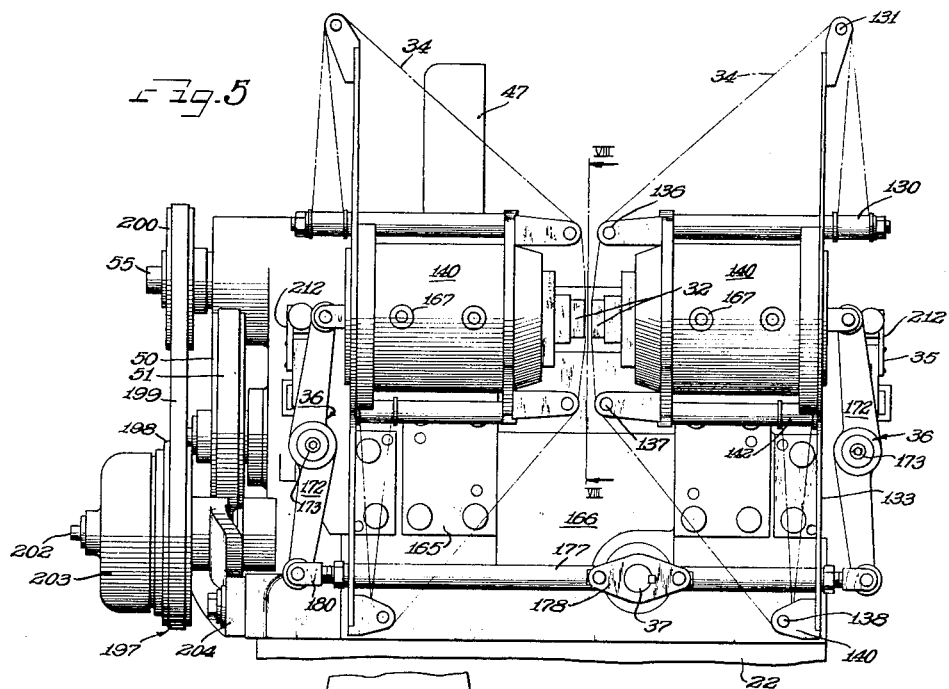
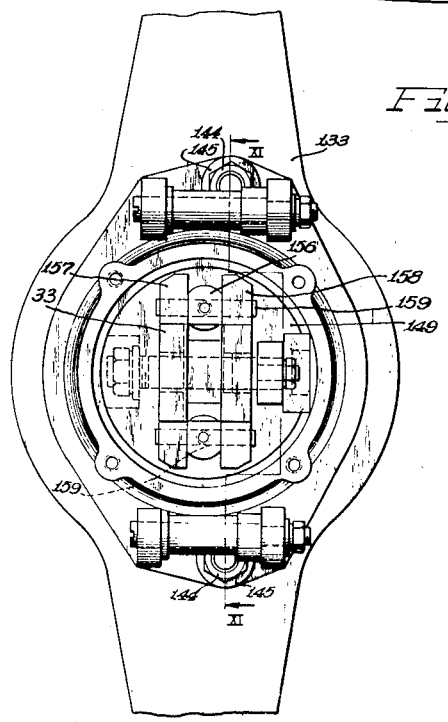
Inventors
Emil Dackor
Edgar F. Nelboeck
Otto Thiel
By The Firm of Charles W. Hills Attys

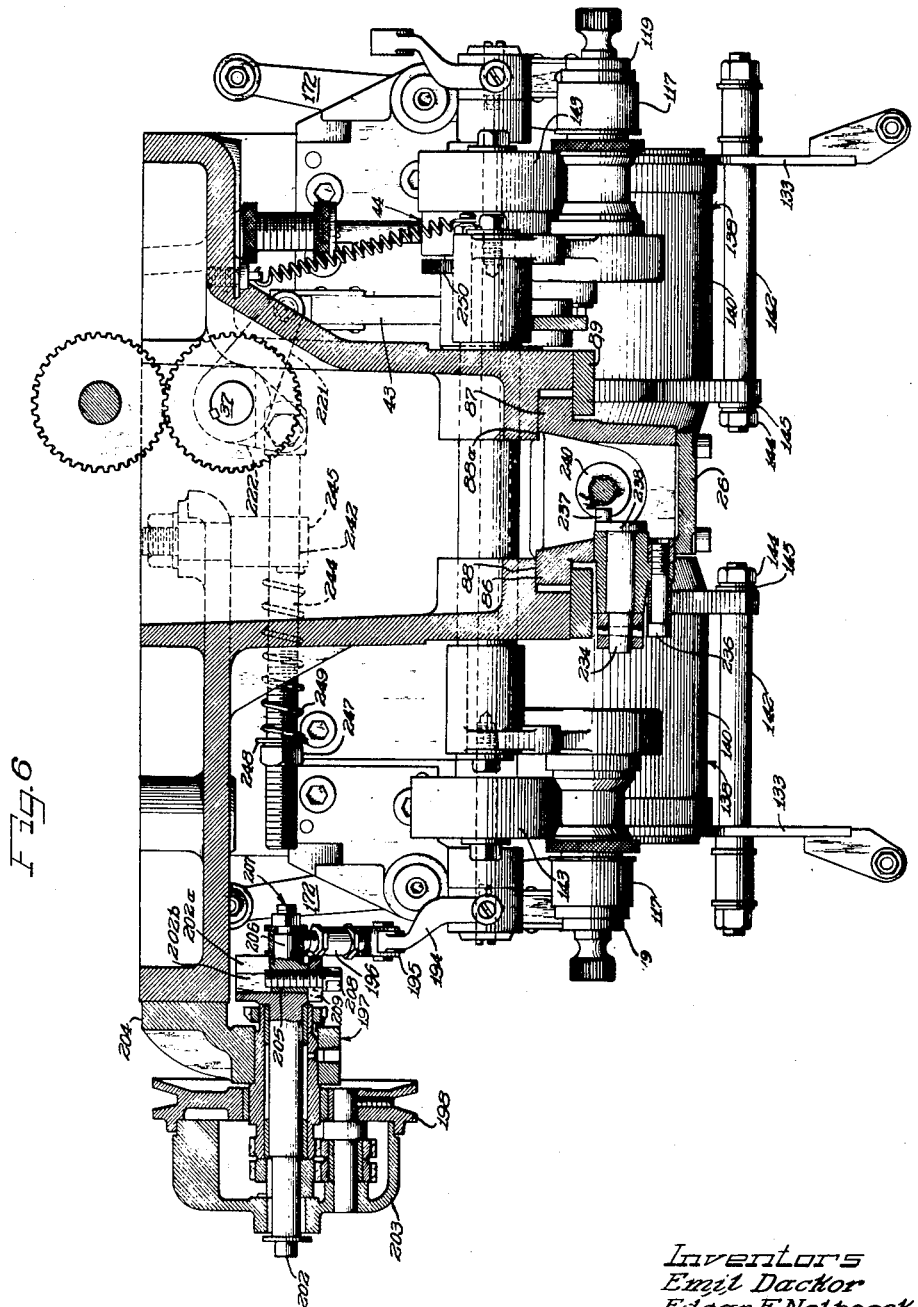

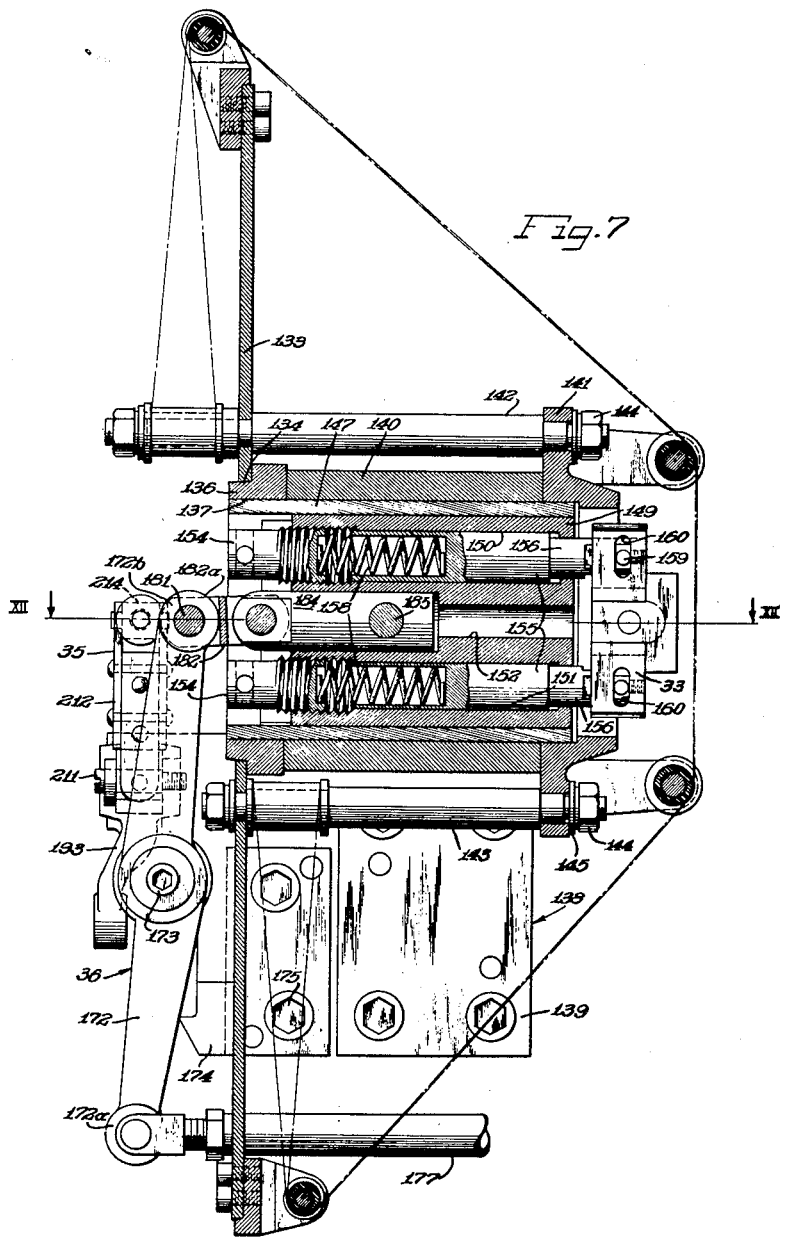

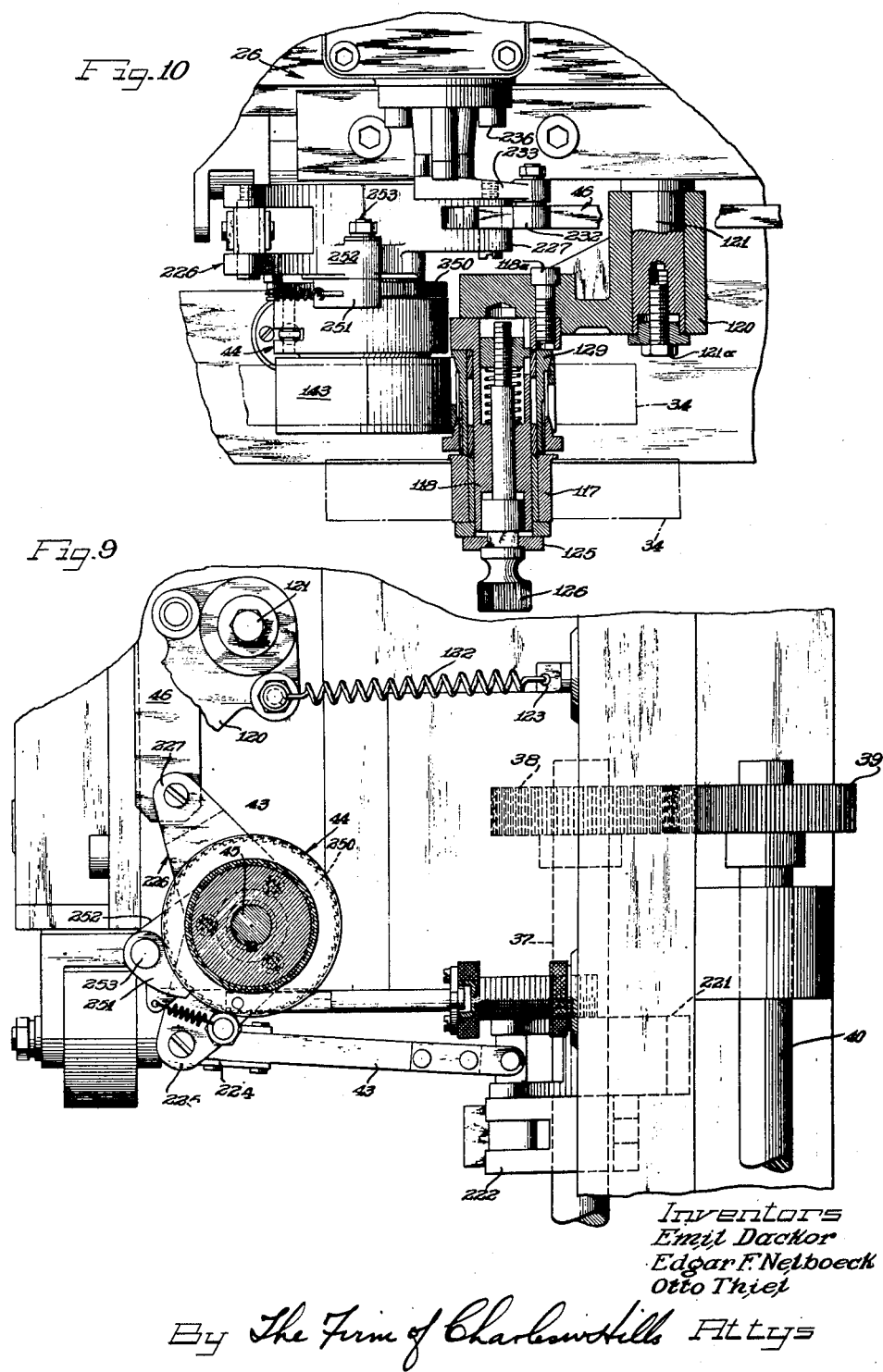

Feb. 27, 1951 — E. DACKOR ET AL — 2,543,236
POLISHING MACHINE FOR TURBINE BLADES
Filed Dec. 29, 1948 — 10 Sheets-Sheet 8

Inventors
Emil Dackor
Edgar F. Netboeck
Otto Thiel
By The Firm of Charles W. Hills
Attys

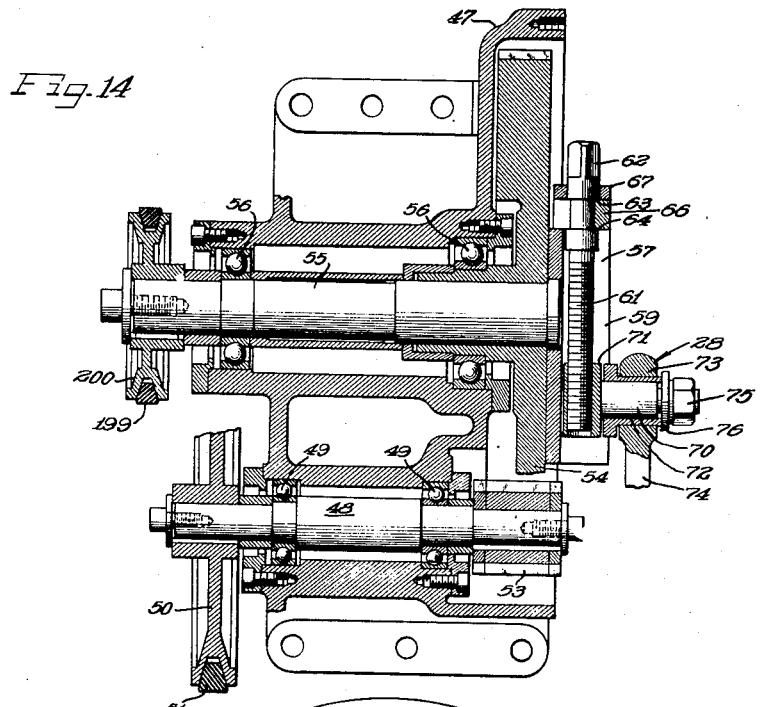
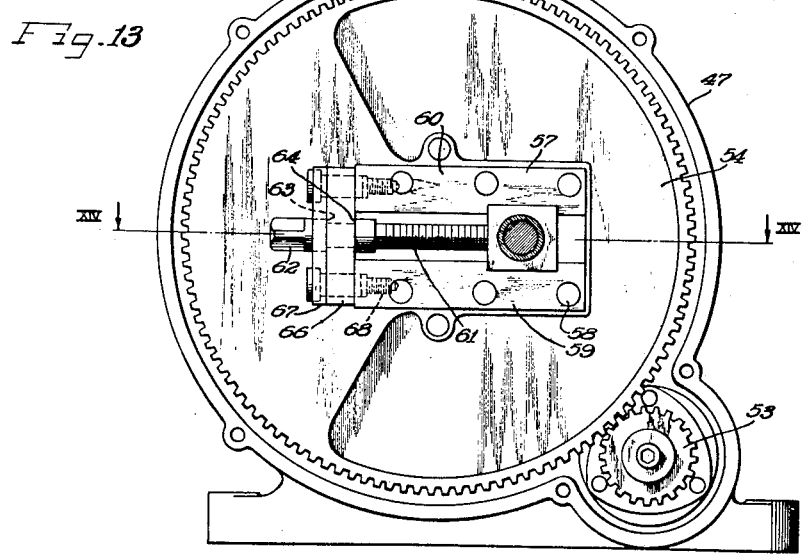

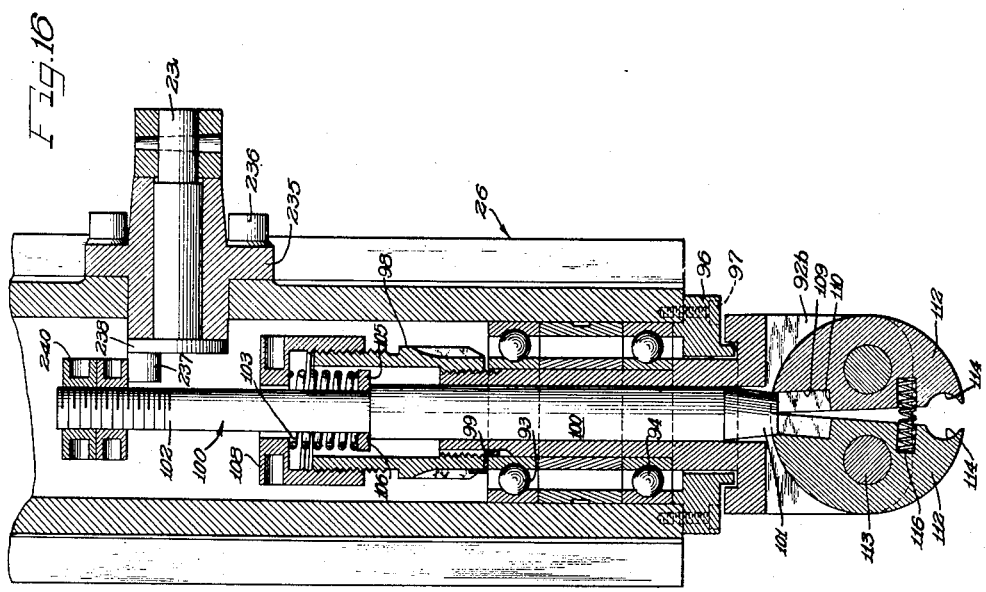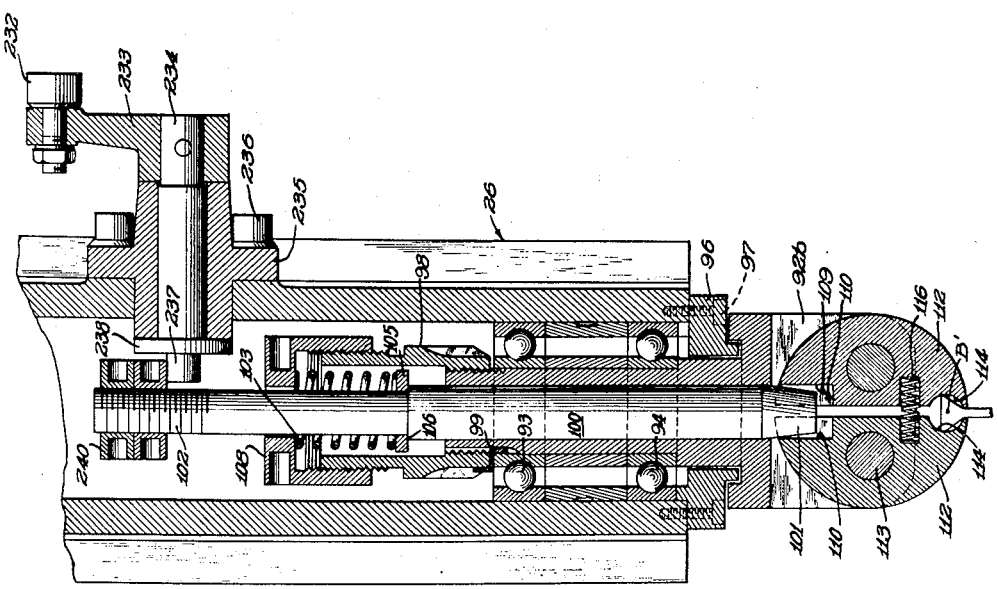

Patented Feb. 27, 1951

2,543,236

UNITED STATES PATENT OFFICE 2,543,236

POLISHING MACHINE FOR TURBINE BLADES

Emil Dackor and Edgar F. Nelboeck, Cleveland, Ohio, and Otto Thiel, Detroit, Mich., assignors to Thompson Products, Inc., Cleveland, Ohio, a corporation of Ohio Application December 29, 1948, Serial No. 67,942

25 Claims. (Cl. 51—64)

This invention relates to a polishing machine, and particularly to a machine for rapidly and economically effecting the polishing of complex arcuate surfaces on a workpiece, such as the surfaces of a turbine blade.

It will be recognized by those skilled in the art that the surfaces of the blades of turbine wheels are of relatively complex configuration, for the most part having in cross-sectional contour an arcuate configuration wherein the radius of curvature of successive portions on the contour varies substantially. Heretofore, the quantity production of turbine blades has been substantially impaired by virtue of the fact that the polishing of the blade surfaces could only be satisfactorily accomplished manually. Such manual operation not only greatly increases the time and cost of production but has the further disadvantage of being dependant in a large extent upon the skill of the particular operator, and hence being subject to wide variations in the quality and uniformity of surface finish obtained.

According to the features of the present invention, a plurality of polishing units are mounted on a rotatable turret for movement in a horizontal plane toward and away from an operator's station.

On each polishing unit a blade is positioned in a clamp-like workholder which engages the base of the blade, holding the body of the blade between opposed spring pressed pads over which abrasive polishing belts are trained. As each polishing unit is moved in a circular path on the turret, the blade is reciprocated by power means carried by each unit in a substantially vertical direction between the pads and the pads are given a reciprocating movement in a substantially horizontal direction by means of a power driven linkage. Thus, during the polishing of the blade no definite polishing path is followed and as a result a highly polished, scratch free surface is obtained on the blade.

As each polishing unit approaches the operator's station, a cam trip mechanism operates on the spring pressed pads to retract them away from the blade. This mechanism also is effective to index the abrasive belt to present a new polishing surface to the next blade to be polished and to also release the grip of the workholding clamp on the blade so that the operator can quickly and easily remove the polished blade and insert a new unpolished blade in the clamp. The operation of retracting the spring pressed pads, indexing the abrasive belt, and releasing the grip of the workholding clamp are effected through a single power shaft and therefore the sequence of operations may be closely controlled.

Accordingly, it is an object of this invention to provide an automatic polishing machine of the turret type wherein a plurality of polishing units receive articles at an operator's station, polish them during continued rotation of the turret and return the polished article to the station for removal therefrom after a predetermined polishing time period whereby a single operator can easily consecutively load and unload all of the units.

It is a further object of this invention to provide an improved machine for polishing complex arcuate surfaces of a workpiece, and particularly a machine that will rapidly, economically and uniformly effect the polishing of the blade surfaces of a turbine wheel.

Another object of this invention is to provide a polishing machine wherein a workpiece is reciprocated between abrasive belts disposed over spring pressed jaws and wherein the jaws are reciprocated simultaneously with the workpiece reciprocation in a direction substantially normal to the path of travel of said workpiece, the combined movement being effective to impart a highly polished surface to the workpiece which is free from scratches typical of a uni-directional polishing movement.

A further object of the present invention is to provide improved means for indexing the abrasive belt for presenting a new work surface to each consecutive blade.

Another and still further object of the present invention is to provide means for automatically clamping and releasing a workpiece from a work holder.

A still further object of the present invention is to provide an improved mechanism for synchronizing the indexing of the abrasive belt with the release of the workpiece from the workholder.

Another and still further object of this invention is to provide a novel means for imparting a reciprocating movement to the belt-carrying pad of the polishing machine of the present invention.

Other and further features, advantages and objects of the present invention will become apparent to one skilled in the art from the following detailed description taken in connection with the annexed sheets of drawings:

On the drawings:

Figure 1 is a more or less diagrammatic top plan view of the turret mounted polishing unit of the present invention;

Figure 2 is a fragmentary vertical sectional view taken substantially on line II—II of Figure 1;

Figure 3 is a fragmentary side elevational view of a polishing unit taken at line III—III of Figure 1;

Figure 4 is a front elevational view of a polishing unit constructed according to the teachings of the present invention.

Figure 5 is a bottom plan view of the polishing unit of the present invention taken along the line V—V of Figure 4;

Figure 6 is a horizontal sectional view taken substantially on line VI—VI of Figure 4;

Figure 7 is a horizontal sectional view taken on line VII—VII of Figure 4 looking in the direction indicated by the arrows;

Figure 8 is a fragmentary side elevational view taken on line VIII—VIII of Figure 5;

Figure 9 is a fragmentary vertical sectional view taken on line IX—IX of Figure 4;

Figure 10 is a fragmentary vertical sectional view taken on substantially line X—X of Figure 3;

Figure 13 is a fragmentary vertical sectional view taken on line XIII—XIII of Figure 4;

Figure 14 is a fragmentary vertical sectional view taken on line XIV—XIV of Figure 13;

Figure 15 is a fragmentary vertical sectional view taken on line XV—XV of Figure 3;

Figure 16 is a fragmentary vertical sectional view similar to Figure 15 showing a revolved position of the clamp of the present invention.

As shown on the drawings:

Figure 12:
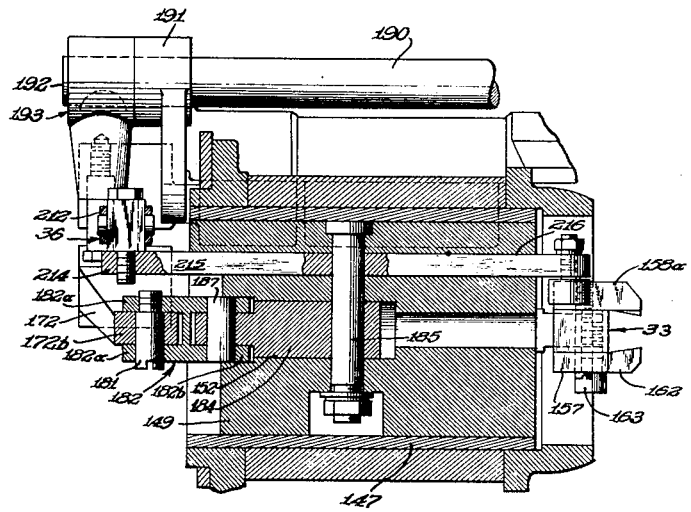
Figure 12 is a fragmentary vertical sectional view taken on line XII—XII of Figure 7.

As seen in Figures 1 and 2, the reference numeral 10 indicates a circular table which is keyed to a short shaft 11 rotatably supported on a pedestal 12 and arranged to be driven through a reduction unit 13 by a motor 14 which is mounted on the inner wall of a cylindrical support base 15. On the under side of the table 10 near its outer periphery a plurality of rollers 17 are mounted in any suitable manner for rolling engagement in a recessed track 18 provided in the upper surface of the cylindrical base 15. The rollers prevent binding of the table on the support base during operation of the table.

According to the teachings of this invention a plurality of polishing units 20 are rigidly secured in an upright position on the upper surface of the table 10 by any suitable means. As the table is rotated by the motor 14 each unit consecutively passes an operator's station where polished work units are removed from the unit and unpolished articles are inserted therein for subsequent polishing as the turret continues its rotation.

Each polishing unit may suitably be mounted on an upright support plate 22 (Figure 2), which has a foot portion 23 secured to the table top, as by means of a plurality of bolts 24. The unit itself may be secured to the upright member 22 by any suitable means as by bolting.

GENERAL OPERATION OF THE POLISHING MACHINE

In Figures 3 and 4 the reference numeral 24 indicates generally the supporting base of a polishing unit 20 which base is secured to the upright support member 22 having an outwardly extending central pad 25 on which a workholding carriage 26 is disposed for sliding movement in a vertical direction longitudinally of the polishing machine. The carriage 26 is reciprocated by means of a power driven mechanism 28 which is mounted on an elevated pad 29 at the upper end of the support face. A turbine blade B is gripped in a clamping assembly 30 at the lower end of the carriage 26 and extends between rubber pads 32 (Figure 4), over which abrasive polishing belts 34 are trained, as shown in Figure 5. The path of travel and the mechanism for feeding the belts over the pads will be described in detail hereinafter.

Figure 11:
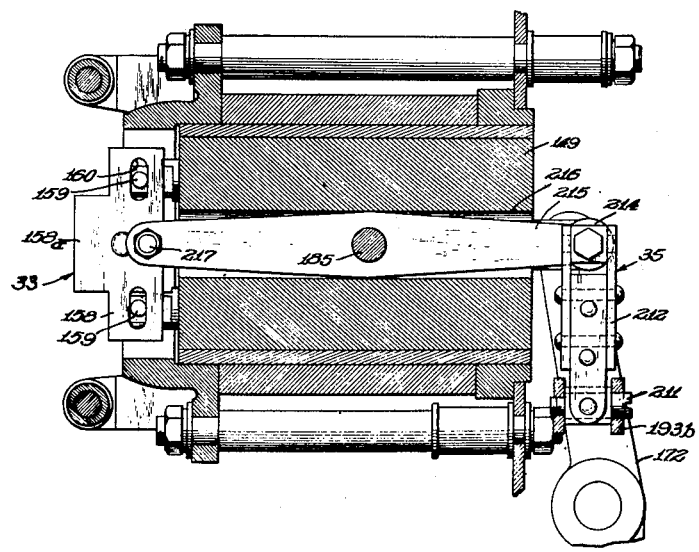
Figure 11 is a fragmentary horizontal sectional view taken on line XI—XI of Figure 8.

As best seen in Figures 3 and 11 a lever mechanism 35, connected to a pad holder 33 is provided to reciprocate each pad in a substantially horizontal direction as the blade B is reciprocated vertically between the abrasive belts 34 disposed over the pads. A pad retracting mechanism 36, Figures 3 and 5, is pivotally connected to each pad assembly and is arranged to simultaneously separate the pads to permit a new blade to be positioned between the belts and to permit new polishing surfaces of the belt to be indexed into position over the pads. This retracting mechanism is driven by a shaft 37 (Figure 5), journaled in the base 24.

As seen in Figures 2 and 9, the shaft 37 is driven through gears 38 and 39 from a shaft 40 which is journaled in the support member 22 and has, at its lower end, a cam follower arm 41 (Figure 1), which is periodically tripped by a camming surface 42 on the interior wall of the support casing 15. It will be understood of course that the cam is so designed as to have a dwell portion of sufficient length to allow the operator to insert the new blade into position in the clamp before the cam follower rises off the camming surface.

Indexing of the abrasive belt 34 is accomplished through the shaft 37 which is connected through a linkage 43 (Figure 9), to a ratchet mechanism 44, which periodically rotates a shaft 45.

The jaws of the clamp 30 are automatically opened by means of a bar 46 which is actuated by a linkage 43 attached to the shaft 45.

DRIVE MECHANISM FOR THE WORK CARRIAGE

In Figures 3, 4, 13 and 14, the reference numeral 47 indicates a gear housing which is secured to the pad 29 of the base 24 by a plurality of bolts 47a. A shaft 48 (Figure 14), is journaled in the gear housing 47 in bearing assemblies 49. A pulley 50, keyed to one end of the shaft 48, is driven through a belt 51 from an external source of power. At the other end of the shaft, a pinion gear 53 is secured thereon in mesh with a crank gear 54 which is keyed to a shaft 55 journaled in bearings 56 of the gear housing. A crank way 57 is secured by bolts 58 (Figure 13), to the large gear 54. The crank way 57 has upstanding walls 59 and 60 defining a passage in which the threaded shank 61 of a crank spindle 62 is enclosed. At one end, the spindle 62 has opposed shoulders 63 and 64 abutting opposite sides of a spacer block 66 which is held against the crank way 57 by a retainer plate 67. A plurality of bolts 68 secure the retainer plate 67 to the crank way 57. A crank pin 70 (Figure 14), is provided with a sleeve portion 71 threaded on the spindle 62. A bearing 72, fitting over the crank pin 70 receives one end 73 of a connecting rod 74 which is held thereon by a nut 75 and washer 76.

Thus, when the power driven shaft 48 is rotated, the gear 54 and the attached crankway 57 will be rotated about the axis of the shaft 55 causing the crank pin 70 to rotate about the same axis.

The amount of eccentricity of the crank pin 70 and consequently the length of the reciprocating stroke of the blade carriage can be adjusted by rotating the spindle 62 to move the sleeve portion 71 on the crank pin 70 toward or away from the axis of the shaft 55.

The connecting rod 74 has a lower eye end at 78 (Figures 3 and 4), journaled on a bearing portion of a cross head 79 which extends through an opening 80 in the carriage 26. A spindle 61 threadingly engages the cross head 79 and transmits the reciprocating movement of the connecting rod 74 through shoulders 83 and 84 to the carriage. By threading the spindle 61 into or out of the cross head 79 the beginning and end of the polishing position can be adjusted.

The carriage 26 has flanges 86 and 87 (Figures 4 and 6), which are arranged to slide in passages defined by wall portions 88 and 88a of the base 24 and elongated plates 89, which are secured to the base 24. Thus, the carriage 26, actuated by the connecting rod 74, must follow a reciprocating, guided path along the base 24.

Work Clamping Mechanism

The blade B which is to be polished is held between arms 92a and 92b of a chuck 92, Figures 15 and 16, which is journaled on bearings 93 and 94 in the opened forward end of the carriage 26. A bearing retainer ring 96 is secured to the end of the carriage by screws 97. A sleeve 98 is threaded on the end of the chuck pressing a lock washer 99 against the end of the bearing 93. A pin 100 is slidably disposed in the chuck 92 having a tapered forward end 101 and a threaded rear end 102. A spring 103 disposed in said sleeve 98 is bottomed against a washer 105 which abuts a shoulder 106 on the pin 100 and is pressed there against by a cap 108 which is threaded on the sleeve 98. Thus, the pin 100 is spring pressed forward so that the tapered end 101 is wedged into a hole 109 defined by recesses 110 at the rear portion of the two jaws 112 which are pivotally mounted on pins 113 between the forward arms 92a and 92b of the chuck 92. Each jaw has a recess portion 114 near its forward end into which a root portion B' of the blade B is disposed. As the tapered end of the pin 100 is spring urged into the hole 109, the jaws 112 pivot on the pins 113 and clamp the workpiece B in position. In Figure 15 the work clamping assembly is shown in a clamping position with the rod 100 moved between the clamping jaws to pivot the jaws against the workpiece in clamping relation thereon. In Figure 16 the retracted open position of the clamping assembly is illustrated.

A spring 116 is disposed in recesses in the jaws 112 for urging the forward end of the jaws to open position.

Mounting for the Abrasive Belt

The abrasive belt 34 is unwound from a supply spool 117 (Figures 4 and 10), rotatably journaled on a mandrel 118 which is secured by cap screws 118a and 119 to an oscillatable arm 120. The arm 120 is rotatably held on a pin 121 extending outwardly from the frame structure 24 by a screw 121a. The arm 120 is normally urged counterclockwise by a spring 122 which engages the arm 120 in hooked engagement at one end and is anchored to the frame at the other end as at 123. The spool 117 is held on the mandrel 118 by a retainer ring 125 at a spring loaded adjusting screw 126. The mandrel 118 is also provided with a collapsing sleeve 129 on which the abrasive belt is wound after it has been used.

As best seen in Figures 3 and 5, the belt 34 on each side of the machine travels along identical paths over identical guide rollers. A description of the belt on one side only will therefore be sufficient for an understanding of this feature of the invention.

After leaving the supply spool 117, the belt 34 is directed downwardly over a guide post or roller 130 where the direction of travel of the belt is changed and it is directed forwardly over the guide roller 131 which is journaled between the posts 132 of an end plate 133. As seen in Figure 5, the belt then proceeds in a substantially horizontal direction over spaced guide rollers 136 and 137 between which is located the pad 32. From the roller 137 the belt is trained over a guide 138 mounted between posts 140 which are mounted at the rear of the machine on the inner face of the end plate 133. After passing over the roller 140 the belt is directed forwardly to a guide roller 142 which directs it upwardly around a friction speed roller 143 (Figure 3), which has a surface covered with a material of high frictional characteristics such as rubber. From the roller 143, the tape is wound on the collapsible sleeve 129 of the mandrel 118.

It will of course be understood that as the frictional roller 143 is oscillated by a ratchet mechanism, to be described in detail hereinafter, it will carry the tape along with it and wind it on the collapsible sleeve 129 with which it is in frictional engagement.

Mounting and Operation of the Tape Carrying Pad

In Figure 5 a view of the polishing machine is shown as seen looking upwardly at the bottom thereof. It will be noted that the linkages 36 which are effective to retract the belt engaging pads 32 are identical on both sides of the machine and are driven from a common shaft 37. It is therefore believed that a detailed description of the operation and structure of the pad controlling mechanism on one side of the machine will be sufficient to disclose this feature of the invention.

Pad mounting

The reference numeral 133 indicates a flat end frame member having an aperture 134 (Figure 7), in which an annular hub member 136 with an aperture 137 is disposed. A bracket 138 has a flange 139 and a sleeve portion 140 and is held between the hub 136 and a retainer hub 141 by an upper spacer bar 142 and a lower spacer bar 143 which have threaded ends receiving nuts 144 and washers 145. The sleeve portion 140 of the bracket 138 thus defines a cylindrical housing into which a bearing sleeve 147 is inserted. A cross slide 149 has a cylindrical outer surface and is arranged for sliding movement in the sleeve 147. The sleeve 147 has three spaced longitudinal apertures 150, 151 and 152 disposed on the horizontal center line of the slide 149. One end of the apertures 150 and 151 is internally threaded to receive the threaded end of the plugs 154. Guide rods 155 are slidably disposed in the other end of the apertures 150 and 151 with reduced portions 156 of the rods passing through reduced portions of the apertures. Shoulder portions are therefore provided in the slide 149 which limits the outward movement of the rod 155. Springs 158 are disposed between the plugs 154 and the rods 155 in recesses provided in the opposed ends of these members.

A pad holder 33 has an H-shape, as seen in Figure 8, and receives the ends 156 of the pins 155 between the arm portions 157 and 158. A pin 159 secured in the end 156 has projecting ends freely disposed in slots 160, Figure 7, of arms 157 and 158. As seen in Figures 11 and 12, the arm 158 has a forwardly extending jaw portion 158a which coacts with a jaw element 162 which is removably secured in a recess in the arm 157 by cap screws 163.

Therefore, the pad 32 is spring pressed in a direction outwardly of the housing towards a pad 32 which is disposed in the housing 140 on the opposite side of the machine. As seen in Figure 5, the downwardly extending flange portion 139 of the bracket 138 is bolted to an upstanding wall 166 of the base 24 for supporting the entire pad housing and mechanism.

It will be seen in Figure 4 that a plurality of set screws 167 are threaded through the sleeve portion 140 of the bracket 138 for engaging the bearing sleeve 147 (Figure 7) and preventing relative rotation of these two members. Further, as seen in Figure 3, a substantially rectangular key 169, which is co-extensive longitudinally with the cross slide 149, fits in a recessed portion 170 of the cross slide 149 and in a recessed portion 171 of the bearing sleeve 147 to prevent relative rotation of the bearing sleeve 147 and the cross slide 149.

Mechanism for retracting the pads

The pad 32 may be retracted by means of a lever 172 (Figure 7), of the linkage 36 which is pivotally mounted by a pin 173 on a bracket 174 secured, by bolts 175, to the upstanding wall 166 of the base 24 (Figure 3). One end 172a of the lever 172 is pivotally connected to a rod 177 which is pivoted on a link 178 (Figure 5), keyed to the shaft 37. The rod 177 may suitably have an internally threaded end portion into which the threaded end of a pivoting connector 180 is engaged.

The other end 172b (Figure 7), of the lever 172 is pivotally secured by a pin 181 between a pair of arms 182a of an H-shaped link 182 (Figure 12). A connector 184 is secured by a bolt 185 in the longitudinal aperture 152 of the cross slide 149, having one end pivotally disposed between the other pair of arms 182b of the H-shaped link 182 on a pin 187. As the lever 172 is pivoted on the pin 173, the cross slide 149, and consequently the pad 32, slide bodily back and forth in the bearing sleeve 147, on Figure 7.

Reciprocation of the pad

In Figures 3 and 4, it is seen that the linkage 35 includes a shaft 190 which extends across the machine and is journaled in bearing arms 191 secured to the upstanding walls 166 of the base 24. At one end 192 of the shaft 190 a bellcrank 193 is keyed. The bellcrank has an arm 193a (Figure 3), extending substantially downwardly for pivotal connection to a connector 195 into which is threaded an elongated connecting rod 196. The rod 196 is given a reciprocating movement by means of a drive mechanism 197 (Figure 4).

In Figures 4 and 14, it is seen that the drive mechanism 197 includes a pulley 198 connected by a belt 199 to a drive pulley 200 that is keyed to the shaft 55. The driven pulley 198 is keyed to a shaft 202 for rotation in a speed reducer assembly 203 which is mounted on a bracket 204 secured to the frame of the machine.

The shaft 202 has an enlarged end portion 202a, (Figure 6), in which a transverse groove 202b is provided. One end 205 of a connector 206 is slidably disposed in the groove 202a while the other end 207 receives the bearing end of the connecting rod 196. A screw 208 is threaded through a plate 209 secured to the enlarged end 202a and into the connector end 205 permitting adjustment of the connector transversely of the shaft 202 to vary the eccentricity of the connecting rod end as it rotates about the axis of the shaft 202. Thus the stroke of the connecting rod 196 may be adjusted.

The other end 193b of the bellcrank 193 is bifurcated and is pivotally mounted on a pin 211 to a composite link 212 (Figure 11), comprising a plurality of straps secured together by bolts. A connector head 214, is pivotally mounted at the upper end of the link 212 and has an arm threadingly engaged in a lever 215 which is disposed in a longitudinal slot 216, which extends through the cross slide 149. The lever 215 is pivoted near its middle portion on the pin 185 which secures the retracting mechanism to the cross slide 149 and is pivotally connected at its free end to the pad holder 32 by a pin 217. It will be seen in Figure 11, that the slot 160 in the pad holder 33 permits the pad holder to be moved in a vertical reciprocating movement without affecting the pins 159 mounted on the forward end of the mechanism used to retract the pad.

In Figure 4, a lever 219 is illustrated as keyed to the end of the shaft 190 on the side of the machine opposite to the driving side. This lever is effective to reciprocate the pad 32 on that side of the machine in exactly the same manner as described in connection with the lever 193.

Therefore, as the shaft 190 is oscillated by reciprocation of the connecting rod 196, the levers 193 and 219 continuously move the pad holder 33 in a substantially horizontal reciprocating path. As heretofore mentioned, this horizontal reciprocation movement of the pad takes place as the workpiece B is reciprocated in a substantial vertical direction between the abrasive belts disposed over the pad 32.

RELEASE MECHANISM FOR THE WORKHOLDING CLAMP

The shaft 40 which is periodically oscillated by the cam on the interior wall of the base 15 drives a shaft 37 which passes through and is keyed to two levers 221 and 222 (Figure 9), each of which has a bifurcated end portion. The lever 221 is pivotally connected to one end of the linkage 43, which carries at its opposite end a connector head 224 (Figure 4). The head 224 is pivotally mounted between arms 225 of a lever 226 which has an H-shaped contour in a plan view, as shown in Figure 4. However, the arms 225 and 227 of the lever 226 are disposed at an angle to each other as seen in Figure 9. The lever 226 is freely mounted on the shaft 45. A strap or bar 46 is pivotally connected between the arms 227 of the lever 226 and between the bifurcated end 229 of a lever 230 which is pivotally mounted on a shaft 231 journaled in the support base pad 25 (Figure 3).

When the shaft 37 is rotated in one direction, the link 43 will pivot the lever 226 counterclockwise as seen in Figure 3 causing the bar 46 to move bodily forwardly into contact with a roller 232. The roller 232 is pivotally secured to a crank arm 233 (Figures 15 and 16) that is keyed to a shaft 234. The shaft 234 is journaled in a bracket 235 secured to the carriage 26 by cap screws 236. At its inner end the shaft 234 carries an arm 237 mounted at the peripheral portion of a circular end member 238 and extending away therefrom for contact with a pair of adjustable nuts 240 on the threaded end of the pin 100. As the roller 232 is swung outwardly by the bar 46, the arm 237 will contact the nuts and move them longitudinally in the carriage as seen in Figure 16 thus retracting the forward end of the pin 100 from between the jaws 112 of the clamp. A pin 242 secured to the carriage 26 limits the clockwise rotation of the crank 233 (Figure 3).

Thus the pin 100 which is normally spring urged into engagement with the jaws of the clamp, is automatically retracted when the bar 46 is raised due to rotation of the shaft 37.

As seen in Figure 6, a rod 242, journaled in a bearing 245 secured to the base 24 has an end portion pivotally mounted in the bifurcated end of the lever 222. The rod 244 is threaded at one end to receive a nut 247 which provides an adjustable stop for a washer 248 freely disposed on the rod 244. A spring 249 disposed over the rod 244 between the washer 248 and the bearing 245 urges the rod to the left, as seen in Figure 6, and causes the shaft 37 to rotate clockwise pivoting the lever 221 clockwise. The link 43 is thus moved to pivot the H-shaped lever 226 clockwise as seen in Figure 9, with the result that the bar 46 is moved away from the handle 232 of the clamp release mechanism. Therefore, after the jaws of the clamp have been released by the action of the bar 46, the spring-urged rod 244 will cause the bar to be moved downwardly. This action of the rod 244 will of course be opposed by the action of the camming surface 42 on the interior wall of the casing 15. Therefore, the jaws of the clamp will be opened when the follower arm 41 is on the dwell portion of the camming surface 42 and the jaw will be spring urged to a closed position by spring 103 (Figure 15), at all other times.

The belt 34 is indexed to present a new polishing surface to the next blade to be polished by means of a ratchet wheel 250, Figure 9, which is mounted on the shaft 45. A pawl 251, pivotally mounted on an ear 252 of the lever 226 by a pin 253, engages the ratchet wheel 250 each time the linkage 43 is moved to the right, as seen in Figure 9, by the lever 221. The take-up friction roller or spool 143 (Figure 10) is keyed to the shaft 45 and thus is indexed each time the ratchet wheel 250 is actuated.

From the foregoing description it will be seen that there is provided in this invention a novel automatic polishing machine of the turret type wherein a plurality of polishing units are mounted on a rotatable table in spaced relation and are arranged to have a workpiece inserted in a clamp member as the unit passes the operator's station and to polish the workpiece as the table rotates through substantially 360°. A novel mechanism is provided for reciprocating the workpiece between spring-pressed pads over which is disposed an abrasive belt. The pads and the belt in turn are given a reciprocating movement in a direction substantially normal to the direction of reciprocation of the workpiece, whereby a scratch-free polished surface is attained on the workpiece. A novel automatically operated mechanism is also provided for operating on each polishing unit as it approaches the operator's station to perform the threefold operation of releasing the grip of the work-holding clamp, retracting the spring-pressed pads from around the workpiece, and indexing the abrasive belt to a new unused working position.

This machine is very efficient in operation and eliminates a great amount of hand polishing, with resultant savings in production costs.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A polishing machine comprising a rotatable table, a plurality of polishing units mounted on the table for rotation therewith, work-carrying means on each unit, opposed polishing members on each unit for receiving the work therebetween, drive means for shifting the work carrying means relative to the polishing members to cause polishing of the work by the polishing members, means for rotating said table to carry the units toward and away from an operator's station, and mechanism acting on the units as they approach the operator's station to release the work carrying means and separate the opposed polishing members for easy removal of the work from the successive units.

2. A polishing machine comprising a rotatable table, a plurality of polishing units mounted in spaced relation on the periphery of said table, a cam mounted below said table at an operator's station, means for rotating said table to move each unit past the operator's station, spaced polishing means on each of said units including a pair of abrasive belts stretched between supply spools and take-up spools, clamping means having jaw members holding a work piece between said abrasive belts, means for reciprocating said clamping means, spring-pressed pads urging said abrasive belts against said work piece, a lever connected to each pad for retracting the pad from contact with the associated abrasive belts, a ratchet mechanism connected to said abrasive belts for indexing the belts over said pads, a bar operable on said clamping means to release their jaws, a rock shaft journaled in each polishing unit having connection with said pad retracting lever, with said ratchet mechanism and with said jaw releasing bar, and a cam follower on each rock shaft arranged to be actuated by said cam for oscillating said rock shaft to retract the pads, index the abrasive belts and release the clamp jaws as the polishing unit reaches the operator's station.

3. A polishing machine comprising a base, a table rotatable relative to said base, a cam disposed on said base at an operator's station, a plurality of polishing units mounted in spaced relation around the periphery of said table, means for rotating said table to move each unit past the operator's station, abrasive belts mounted on each of said units in spaced relation, clamping means having jaw members holding a workpiece between said abrasive belts, means for reciprocating said clamping means, spring pressed pads urging said abrasive belts against said workpiece, a rock shaft journaled in said units and connected to said clamping means for releasing jaw members connected to said pads for retracting the pads from contact with said abrasive belts, and a cam follower in driving engagement with said shaft and arranged to be actuated by said cam for releasing the jaws of said clamps and retracting said pads at the operator's station.

4. A polishing machine comprising a rotatable table, a plurality of polishing units mounted in spaced relation around the periphery of said table, means for rotating said table for moving each unit past an operator's station, clamp means on each unit for holding a workpiece, abrasive means on each unit operable on the workpiece for polishing the same, spring urged pads on either side of said abrasive means pressing said abrasive means against said workpiece, means for reciprocating the workpiece between said pads, and means for reciprocating said pads substantially normal to the direction of reciprocation of said work piece.

5. A polishing machine comprising a rotatable table, a plurality of polishing units mounted on said table in spaced relation around the periphery thereof, means for rotating said table for moving each unit past an operator's station, clamp means on each unit for holding a work piece, abrasive means on each unit operable on the work piece for polishing the same, spring urged pads on either side of said abrasive means pressing said abrasive means against said work piece, means for reciprocating the work piece between said pads, means for reciprocating said pads in a direction substantially normal to the direction of reciprocation of said work piece, and means at the operator's station for releasing the grip of said clamp means for moving said abrasive means over said pads and for retracting said pads from pressing contact with said abrasive means.

6. A polishing machine comprising a rotatable table, a plurality of polishing units mounted in spaced relation around the peripheral edge of said table, power means for rotating said table to move each unit toward and away from an operator's station, clamp means on each of said units for holding a work piece, abrasive means on each unit for polishing said work piece as the table rotates, and means for automatically releasing said clamp means as the unit approaches the operator's station.

7. A polishing machine comprising a support structure, polishing members mounted in opposed relation on said structure, a housing slidably mounted on said structure, a clamp disposed at one end of said housing for movement therewith having jaw members holding a workpiece between said polishing members, a rod journaled in said housing having an end portion engaging said jaw members to maintain them in gripping relation on said workpiece, a lever journaled in said housing having an inner end engaging said rod, and an outer end projecting from the side of the housing, means for reciprocating said clamp on said support structure, a bar pivotally mounted on said support structure and extending longitudinally of said housing with a portion disposed under the outer end of said levers for every position of said reciprocating housing, and means for periodically pivoting said bar to trip said lever and moving said rod to release the grip of said jaws.

8. In a polishing machine, a support structure, a housing mounted for reciprocation on said structure, a pair of jaws pivotally mounted at one end of said housing, a rod journaled in said housing having a tapered end portion in wedging engagement between said jaws for pivoting them into gripping engagement around a work piece, a lever journaled in said housing having one end associated with said rod for moving it longitudinally of said housing and having the other end projecting outwardly of said housing, a bar pivotally mounted on said support structure below said outwardly projecting end of said lever, and a rock shaft connected to said bar for pivoting the same to trip said lever whereby said rod is moved longitudinally in said housing out of wedging engagement with said jaws.

9. A polishing machine comprising a support structure, polishing members mounted in opposed relation on said structure, a clamp slidably mounted on said structure having jaw members holding a workpiece between said polishing members, spring means urging said polishing members toward each other and into contact with opposite sides of said workpiece, means for reciprocating said polishing members, means for reciprocating said clamp on said support structure to move the workpiece between said polishing members, and means for relieving the pressure of said spring means on said polishing members after a predetermined polishing period.

10. A polishing machine comprising a support structure, polishing members mounted in opposed relation on said support structure, a clamp slidably mounted on said structure having jaw members holding a workpiece between said polishing members, spring means urging said polishing members toward each other and against opposite sides of the workpiece, means for reciprocating said clamp on said structure, each of said polishing means including a pad and an abrasive belt disposed over said pads, means for reciprocating said clamp on said support structure, a linkage connected to each of said pads for moving the pad away from the opposed pad against the action of said spring means, and means for periodically actuating said linkage.

11. In a polishing machine, a support structure, housings mounted in opposed relation on said structure, a member slidably disposed in each housing, a polishing pad mounted on the end of each member confronting a pad on the opposed member, a lever connected to each member for reciprocating the same in the associated housing, a rock shaft operable on each of said levers to effect reciprocation of said members, and means for periodically oscillating said rock shaft.

12. A polishing machine comprising a support structure, a pair of abrasive belts disposed in opposed relation on said structure, a work carrying member having clamping means for holding a workpiece between said belts, pressure means for moving the abrasive surfaces of said belts against the opposite faces of said workpiece at a polishing station, means for reciprocating said work carrying member on said structure to move said workpiece between said belts, and means for releasing said pressure means from said belts, releasing the grip of said clamping means on said work-piece and indexing said belts after a predetermined polishing period to move a new abrasive surface on each of said belts to the polishing station.

13. A polishing machine comprising a support structure, a pair of abrasive polishing members mounted on said structure in opposed relation, each polishing member including an abrasive belt stretched between a supply spool and a take-up spool, a clamp slidably mounted on said structure having jaw members holding said workpiece between said polishing belts at a polishing station, means for reciprocating said clamp, an idler roller having a friction surface in driving engagement with said take-up spool, a ratchet mechanism mounted on said structure in driving engagement with said idler roller, and means for automatically indexing said ratchet member to move a new abrasive surface of said belt to said polishing station after a predetermined polishing period.

14. In a polishing machine, a support structure, a polishing member mounted on said support structure including an abrasive belt stretched between a supply spool and a take-up spool, means for reciprocating a workpiece over said belt, an idler roller having a friction surface engaging said take up spool for rotating the same, a ratchet mechanism for periodically indexing said idler roller, and a rock shaft connected to said ratchet mechanism and means for periodically oscillating said rock shaft.

15. A polishing machine comprising a support structure, polishing members mounted in opposed relation on said structure, a clamp mounted on said structure having jaw members holding a workpiece between said polishing members, means urging said polishing members toward each other and into contact with opposite sides of said workpiece, means for actuating said clamp structure to reciprocate said work-piece between said polishing members, and means for simultaneously reciprocating said polishing members over said reciprocating workpiece.

16. A polishing machine comprising a support structure, a pair of abrasive belts disposed in close confronting relation on said support structure, a work holder arranged to hold a workpiece between said belts in contact therewith, means for reciprocating said work holder to cause said workpiece to be polished by said belt, and means for reciprocating said belts in a direction substantially normal to the direction of movement of said workpiece.

17. A machine for polishing a workpiece comprising a support structure, a work carrying member reciprocal on said structure, pads disposed on opposite sides of said workpiece and pressing thereagainst, abrasive belts disposed over said pads, means for reciprocating the workpiece in said work carrying member between said pads, and means for moving said pads transversely of said workpiece as said work is reciprocated therebetween.

18. A polishing machine comprising a support structure, polishing members mounted in opposed relation on said structure, a clamp slidably mounted on said support structure having jaw members holding a workpiece between said polishing members, means urging said polishing members toward each other and against opposite sides of said workpiece, means for reciprocating said polishing members and means for reciprocating said clamp on said structure to move the workpiece between said polishing members.

19. A polishing machine comprising a support structure, spaced polishing members secured on said structure, a carriage slidably mounted in ways on said support structure, a clamp secured to said carriage having jaw members holding a workpiece between said polishing members, spring means urging said polishing members against opposite sides of said workpiece, means for reciprocating said carriage to move said workpiece between said polishing members including a cross head adjustably mounted in said carriage, a connecting rod pivotally secured to said cross head, a crank arm pivotally connected to said connecting rod, a crank way adjustably receiving said crank arm, and a power driven shaft connected to said crank way for rotating the same, adjustment of said cross head being effective to vary the starting point of the stroke of the cross head and adjustment of the crank arm in the crankway being effective to regulate the length of stroke.

20. A polishing machine comprising a support structure, polishing members mounted in opposed relation on said structure, a clamp mounted on said structure having jaw members holding a workpiece between said polishing members, means for reciprocating said clamp to move said workpiece between said polishing members, spring means urging said polishing members toward each other and into contact with the opposite sides of said workpiece, and means for reciprocating said polishing members over said workpiece, said means including a pair of housings mounted in spaced opposed relation on said support structure, each housing having a central bore, a cylindrical member slidably mounted in the bore of each housing, a pad secured to the end of each cylindrical member movable longitudinally with said member and transversely relative to said member, each of said cylindrical members having a longitudinal slot therein, a lever pivotally mounted in each slot having an end pivotally secured to the associated pad, and means for oscillating said levers to reciprocate said pads transversely of said cylindrical members and across said workpiece.

21. In a polishing machine, a support structure, a pair of housings mounted in spaced opposed relation on said support structure, each housing having a central bore, a cylindrical member slidably mounted in the bore of each housing, each cylindrical member having a slot extending longitudinally in one wall thereof, a pad secured to the end of each cylindrical member in confronting relation to the pad secured on the other cylindrical member, said pads having a slotted connection with said cylindrical member to permit movement of the pad transversely of the member, a lever pivotally disposed in the slot in each member and secured at one end in pivotal engagement with said pad, a linkage secured to the other end of said lever for pivoting the lever to move the pad transversely of the member, and means for periodically actuating said linkage.

22. A polishing machine comprising a support housing, a member slidably disposed in said housing, a polishing pad mounted on the end of said member, a lever connected to said member for reciprocating the same in said housing, a rock shaft operable on said lever to effect reciprocation of said member, and means for periodically oscillating said rock shaft.

23. In a polishing machine, a support structure, a housing mounted for reciprocation on said structure, a pair of jaws pivotally mounted at one end of said housing, a rod journalled in said housing having a tapered end portion in wedging engagement between said jaws for pivoting them into gripping engagement around a workpiece, and a lever mechanism controlled exteriorly of said housing and operatively connected to said rod to move the rod longitudinally in said housing for wedging engagement with said jaws.

24. A polishing machine comprising a rotatable table, a plurality of polishing units mounted on the table for rotation therewith, means for rotating said table to carry units toward and away from an operator's station, work-carrying means on each unit, means on each unit for polishing work held by said work carrying means as the table rotates through a predetermined angular path, and means for automatically opening the work carrying means to release the work at the end of said path and to close the work carrying means for gripping the work at the beginning of said path.

25. A polishing machine comprising a rotatable table, a plurality of independently operable polishing units mounted on said table, work-carrying clamps on each unit, means for rotating said table to move said units consecutively to an operator's station, and automatic means controlled by the rotatable table for successively releasing the clamping devices of the units to successively provide the released clamping devices at the operator's station.

EMIL DACKOR.
EDGAR F. NELBOECK.
OTTO THIEL.

REFERENCES CITED

The following references are of record in the file of this patent:

UNITED STATES PATENTS

| Number | Name | Date |
|---|---|---|
| Re. 16,141 | McDonough | Aug. 11, 1925 |
| 676,700 | Roper | June 18, 1901 |
| 1,459,085 | Black | June 19, 1923 |
| 1,490,631 | Newkirk et al. | Apr. 15, 1924 |
| 1,905,651 | Raule | Apr. 25, 1933 |
| 2,082,020 | Moon | June 1, 1937 |
| 2,123,171 | Hamilton | July 12, 1938 |
| 2,261,902 | Indge | Nov. 4, 1941 |
| 2,461,948 | Whitehead | Feb. 15, 1949 |